(12) United States Patent
Hori

(10) Patent No.: US 11,401,846 B2
(45) Date of Patent: Aug. 2, 2022

(54) OIL MIST SEPARATOR FOR INTERNAL COMBUSTION ENGINE

(71) Applicant: TOYOTA BOSHOKU KABUSHIKI KAISHA, Aichi-ken (JP)

(72) Inventor: Tatsuya Hori, Ichinomiya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/235,352

(22) Filed: Apr. 20, 2021

(65) Prior Publication Data

US 2021/0332727 A1 Oct. 28, 2021

(30) Foreign Application Priority Data

Apr. 24, 2020 (JP) .............................. JP2020-077482

(51) Int. Cl.
*F01M 13/04* (2006.01)
*B01D 45/08* (2006.01)

(52) U.S. Cl.
CPC ......... *F01M 13/0416* (2013.01); *B01D 45/08* (2013.01)

(58) Field of Classification Search
CPC ........................ F01M 13/0416; B01D 45/08
See application file for complete search history.

(56) References Cited

U.S. PATENT DOCUMENTS 4,597,372 A * 7/1986 Furukawa .............. F01M 11/00
123/573

FOREIGN PATENT DOCUMENTS

JP 2011-252462 A 12/2011
JP 2014-238032 A 12/2014

* cited by examiner

*Primary Examiner* — Kevin A Lathers
(74) *Attorney, Agent, or Firm* — Greenblum & Bernstein, P.L.C.

(57) ABSTRACT

An oil mist separator for an internal combustion engine includes a cylinder head cover, a baffle plate, and a cam spray plate. The baffle plate is fixed to an inner surface of the cylinder head cover. A section between the cylinder head cover and the baffle plate defines an oil separation chamber. The cam spray plate is fixed to a surface of the baffle plate opposite to the cylinder head cover. The cam spray plate defines an oil passage. The baffle plate includes a discharge hole through which oil separated from blow-by gas by the oil separation chamber is discharged. The cam spray plate includes a passage defining portion and a baffle plate portion. The passage defining portion defines the oil passage. The baffle plate portion is integrated with the passage defining portion and overlapped with the discharge hole.

10 Claims, 2 Drawing Sheets

OIL MIST SEPARATOR FOR INTERNAL COMBUSTION ENGINE

BACKGROUND

1. Field

The present disclosure relates to an oil mist separator for an internal combustion engine.

2. Description of Related Art

Japanese Laid-Open Patent Publication No. 2011-252462 discloses an oil mist separator for an internal combustion engine. The internal combustion engine includes a cylinder head to which a cylinder head cover is attached. A baffle plate is coupled to the inner side of the cylinder head cover. The space surrounded by the cylinder head cover and the baffle plate defines an oil mist separation chamber. The oil mist separation chamber separates oil from blow-by gas in the internal combustion engine. The portion of the baffle plate defining the oil mist separation chamber includes a collection hole through which the oil separated from the blow-by gas returns to the crankcase of the internal combustion engine.

Japanese Laid-Open Patent Publication No. 2014-238032 discloses a structure in which a cam spray plate is coupled to the lower surface of a baffle plate through vibration welding.

In such an oil mist separator, the oil dispersed by the rotation of the camshaft and the blow-by gas containing oil may flow backward into the oil mist separation chamber through the collection hole (hereinafter referred to as a discharge hole). In this case, the oil that has flowed backward into the oil mist separation chamber may flow back into the intake passage of the internal combustion engine.

SUMMARY

It is an object of the present disclosure to provide an oil mist separator for an internal combustion engine capable of preventing, with a simple structure, oil from flowing backward through a discharge hole.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An oil mist separator for an internal combustion engine that solves the above-described objective includes a cylinder head cover, a baffle plate fixed to an inner surface of the cylinder head cover, a section between the cylinder head cover and the baffle plate defining an oil separation chamber that separates oil from blow-by gas in the internal combustion engine, and a cam spray plate fixed to a surface of the baffle plate opposite to the cylinder head cover, the cam spray plate defining an oil passage through which oil is supplied to a camshaft of the internal combustion engine. The baffle plate includes a discharge hole through which the oil separated from the blow-by gas by the oil separation chamber is discharged. The cam spray plate includes a passage defining portion and a baffle plate portion, the passage defining portion defining the oil passage, the baffle plate portion being integrated with the passage defining portion and overlapped with the discharge hole.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An oil mist separator for an internal combustion engine according to an embodiment will now be described with reference to FIGS. 1 and 2.

First, the basic structure of the oil mist separator will be described.

Figure 1:
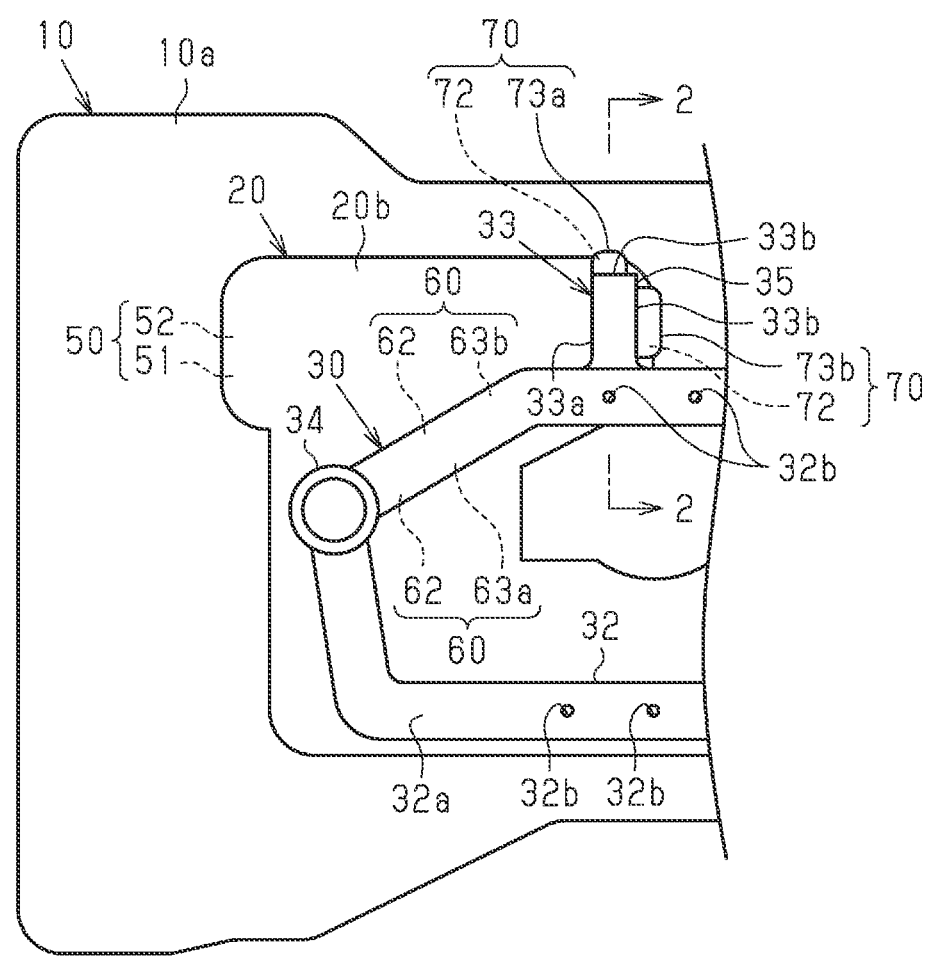
FIG. 1 is a bottom view showing a cylinder head cover, a baffle plate, and a cam spray plate of an oil mist separator for an internal combustion engine according to an embodiment.
Figure 2:
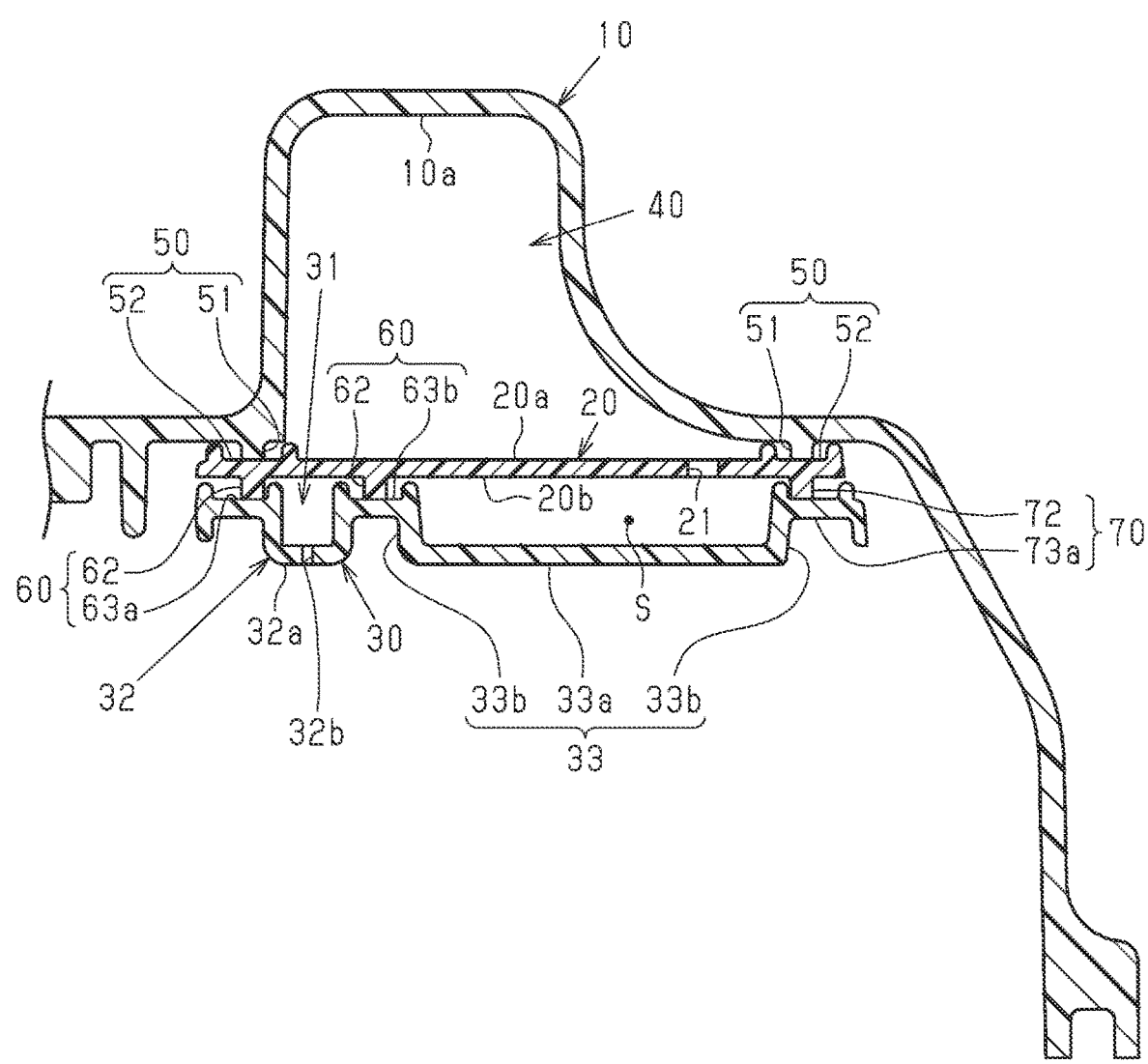
FIG. 2 is a cross-sectional view taken along line 2-2 in FIG. 1.

As shown in FIGS. 1 and 2, the oil mist separator includes a plastic cylinder head cover 10, a plastic baffle plate 20, and a plastic cam spray plate 30.

The baffle plate 20 is fixed to an inner surface 10a of the cylinder head cover 10 through welding.

An oil separation chamber 40 is defined between the cylinder head cover 10 and the baffle plate 20. The oil separation chamber 40 separates oil from blow-by gas in the internal combustion engine.

The oil separation chamber 40 includes, for example, a labyrinth structure. The labyrinth structure includes the inner surface 10a of the cylinder head cover 10, a surface of the baffle plate 20 facing the cylinder head cover 10 (hereinafter referred to as an upper surface 20a), and baffle walls (not shown) protruding alternately from the inner surface 10a and the upper surface 20a.

The baffle plate 20 includes an inlet (not shown) and a discharge hole 21. The blow-by gas in the internal combustion engine is drawn through the inlet into the oil separation chamber 40. The oil separated from the blow-by gas is discharged out of the oil separation chamber 40 through the discharge hole 21.

The cylinder head cover 10 includes a discharge port (not shown). The blow-by gas separated from oil is discharged out of the oil separation chamber 40 through the discharge port toward the intake passage of the internal combustion engine.

As shown in FIGS. 1 and 2, the cam spray plate 30 is fixed to a surface of the baffle plate 20 opposite to the cylinder head cover 10 (hereinafter referred to as a lower surface 20b) through welding.

The cam spray plate 30 includes a connection portion 34, a passage defining portion 32, and a baffle plate portion 33. The connection portion 34 is connected to a supply passage through which oil is supplied from an oil pump (not shown). The passage defining portion 32 extends from the connection portion 34. An oil passage 31 is defined between the passage defining portion 32 and the lower surface 20b of the baffle plate 20. The baffle plate portion 33 is integrated with the passage defining portion 32 and overlapped with the discharge hole 21. The cam spray plate 30 is an undivided component.

The passage defining portion 32 has a gutter shape that opens toward the lower surface 20b of the baffle plate 20. The passage defining portion 32 includes a bottom wall 32a. The bottom wall 32a includes holes 32b, through which oil drips toward the camshaft (not shown) of the internal combustion engine.

As shown in FIG. 2, the baffle plate portion 33 includes a bottom wall 33a and three side walls 33b. The bottom wall 33a is arranged to create a gap S between the bottom wall 33a and the lower surface 20b of the baffle plate 20. The side walls 33b extend from the edge of the bottom wall 33a toward the lower surface 20b of the baffle plate 20.

As shown in FIG. 1, the bottom wall 33a is rectangular in a bottom view.

One of the three side walls 33b is continuous with the passage defining portion 32.

The outer surfaces of the two adjacent side walls 33b are respectively provided with fixed portions 73a, 73b, which are fixed to the baffle plate 20. Each of the fixed portions 73a, 73b is continuous with the outer surface of the corresponding side wall 33b.

The fixed portions 73a, 73b are spaced apart from each other. A discharge portion 35 is arranged between the fixed portions 73a, 73b so that oil in the gap S between the baffle plate portion 33 and the baffle plate 20 is discharged through the discharge portion 35.

Of the four sides of the bottom wall 33a, the side opposite to the side including the fixed portion 73b is not provided with the side wall 33b.

The welding structure of the oil mist separator will now be described.

As shown in FIGS. 1 and 2, the baffle plate 20 and the cylinder head cover 10 are fixed to each other by a first weld part 50. The first weld part 50 includes a weld surface 52 and a weld rib 51, which are welded to each other through vibration welding. The weld surface 52 extends along the outer edge of the baffle plate 20. The weld rib 51 protrudes from the inner surface 10a of the cylinder head cover 10 toward the weld surface 52 and extends along the weld surface 52.

As shown in FIGS. 1 and 2, the cam spray plate 30 and the baffle plate 20 are fixed to each other by second weld parts 60. The second weld parts 60 include weld surfaces 63a, 63b and weld ribs 62, which are welded to each other through vibration welding. The weld surfaces 63a, 63b respectively protrude from the two outer surfaces of the passage defining portion 32 and extend in the extending direction of the passage defining portion 32. The weld ribs 62 protrude from the lower surface 20b of the baffle plate 20 toward the weld surfaces 63a, 63b and extend along the weld surfaces 63a, 63b.

A part of the weld surface 63b corresponds to one surface of the section where the passage defining portion 32 and the baffle plate portion 33 are coupled to each other.

As shown in FIG. 2, the second weld parts 60 include a section that overlaps the first weld part 50 in the thickness direction of the baffle plate 20. More specifically, the second weld parts 60 include a section in which the weld ribs 62 of the second weld parts 60 overlap the weld rib 51 of the first weld part 50 in the thickness direction.

As shown in FIGS. 1 and 2, the baffle plate portion 33 of the cam spray plate 30 and the baffle plate 20 are fixed to each other by third weld parts 70. The third weld parts 70 include fixed portions 73a, 73b of the baffle plate portion 33 and weld ribs 72, which are welded to each other through vibration welding. The weld ribs 72 protrude from the lower surface 20b of the baffle plate 20 toward the fixed portions 73a, 73b and extend along the fixed portions 73a, 73b.

The third weld parts 70 overlap the first weld part 50 in the thickness direction of the baffle plate 20. More specifically, the weld ribs 72 of the third weld parts 70 overlap the weld rib 51 of the first weld part 50 in the thickness direction.

The operation of the present embodiment will now be described.

Referring to FIGS. 1 and 2, the blow-by gas in the crankcase of the internal combustion engine is drawn from the inlet (not shown) of the baffle plate 20 into the cylinder head cover 10.

Oil is separated from the blow-by gas when the blow-by gas collides with the baffle walls (not shown) of the oil separation chamber 40 in the cylinder head cover 10.

The blow-by gas from which the oil has been separated is returned from the discharge port (not shown) of the cylinder head cover 10 to the intake passage of the internal combustion engine. The separated oil drops on the upper surface 20a of the baffle plate 20 and is then discharged from the discharge hole 21 to the outside of the oil separation chamber 40.

Accordingly, the oil dispersed by the rotation of the camshaft (not shown) and the blow-by gas containing oil do not easily reach the discharge hole 21 when they collide with the baffle plate portion 33.

The advantages of the present embodiment will now be described.

(1) The cam spray plate 30 includes the passage defining portion 32, which defines the oil passage 31, and the baffle plate portion 33, which is integrated with the passage defining portion 32 and overlapped with the discharge hole 21.

Such a structure produces the above-described operation. Thus, the above-described oil and blow-by gas are prevented from flowing backward through the discharge hole 21 into the oil separation chamber 40.

Additionally, in the above-described structure, the baffle plate portion 33 is integrated with the cam spray plate 30. This limits the number of components.

Accordingly, the backward flow of oil through the discharge hole 21 is stopped by a simple structure.

(2) The baffle plate portion 33 includes the fixed portions 73a, 73b, which are fixed to the baffle plate 20.

In such a structure, since the fixed portions 73a, 73b of the baffle plate portion 33 are fixed to the baffle plate 20, the cam spray plate 30 including the baffle plate portion 33 is stably fixed to the baffle plate 20.

(3) The cylinder head cover 10, the baffle plate 20, and the cam spray plate 30 are made of plastic. The cylinder head cover 10 is fixed to the baffle plate 20 through welding. The baffle plate 20 is fixed to the cam spray plate 30 through welding. The fixed portions 73a, 73b are fixed to the baffle plate 20 through welding. The fixed portions 73a, 73b overlap the first weld part 50, by which the cylinder head cover 10 and the baffle plate 20 are welded to each other, in the thickness direction of the baffle plate 20.

Hypothetically, the cylinder head cover 10, the baffle plate 20, and the cam spray plate 30 are simultaneously fixed to each other through vibration welding. In this case, a jig is used to indirectly hold the baffle plate 20 with the cam spray plate 30 in the section where the baffle plate 20 overlaps the cam spray plate 30. Further, the jig is used to vibrate the cam spray plate 30 and the baffle plate 20 relative to the cylinder head cover 10. If the positions of the fixed portions 73a, 73b of the baffle plate portion 33, which are fixed to the baffle plate 20 through welding, deviate from the position of the first weld part 50, by which the cylinder head cover 10 is welded to the baffle plate 20, the vibration from the jig is not easily transferred to the first weld part 50 through the cam spray plate 30. As a result, increasing the strength of welding the cylinder head cover 10 to the baffle plate 20 is difficult.

In the above-described structure, the fixed portions 73a, 73b overlap the first weld part 50, by which the cylinder head cover 10 and the baffle plate 20 are welded to each other, in the thickness direction of the baffle plate 20. Thus, the vibration from the jig is easily transferred to the first weld part 50 through the cam spray plate 30. This increases the strength of welding the cylinder head cover 10 to the baffle plate 20.

(4) The fixed portions 73a, 73b are spaced apart from each other. The discharge portion 35 is arranged between the fixed portions 73a, 73b so that oil in the gap S between the baffle plate portion 33 and the baffle plate 20 is discharged through the discharge portion 35.

In such a structure, the oil discharged through the discharge hole 21 to the section between the baffle plate portion 33 and the baffle plate 20 is externally discharged through the discharge portion 35, which is arranged between the fixed portions 73a, 73b. This prevents the oil from remaining in the gap S between the baffle plate portion 33 and the baffle plate 20. Accordingly, the oil is stably discharged through the discharge hole 21.

Modifications

The present embodiment may be modified as follows. The present embodiment and the following modifications can be combined as long as they remain technically consistent with each other.

The number of the fixed portions 73a, 73b does not have to be two as described in the present embodiment. Instead, for example, the number of the fixed portions 73a, 73b may be one or may be three or more. In this case, the number of the discharge portions 35 is not limited to that described in the present embodiment and may be changed in correspondence with the number of the fixed portions.

The size and the shape of the baffle plate portion 33 are not limited to the ones described in the present embodiment. That is, the size and the shape of the baffle plate portion 33 may be changed as long as the baffle plate portion 33 overlaps the discharge hole 21 of the baffle plate 20 in the thickness direction.

The cylinder head cover 10 and the baffle plate 20 do not have to be fixed through welding. Instead, for example, the cylinder head cover 10 and the baffle plate 20 may be fixed by screw-fastening or snap-fitting. Additionally, the baffle plate 20 and the cam spray plate 30 do not have to be fixed through welding. Instead, for example, the baffle plate 20 and the cam spray plate 30 may be fixed by screw-fastening or snap-fitting.

The fixed portions of the baffle plate portion 33 may be omitted.

The oil separation chamber 40 does not have to include the baffle walls and separate oil by causing blow-by gas to collide with the baffle walls as described in the present embodiment. Instead, for example, the oil separation chamber 40 may include a filter. In this case, oil is separated from blow-bay gas by passing the blow-by gas through the filter.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An oil mist separator for an internal combustion engine, the oil mist separator comprising:
    a cylinder head cover;
    a baffle plate fixed to an inner surface of the cylinder head cover, a section between the cylinder head cover and the baffle plate defining an oil separation chamber that separates oil from blow-by gas in the internal combustion engine; and
    a cam spray plate fixed to a surface of the baffle plate opposite to the cylinder head cover, the cam spray plate defining an oil passage through which oil is supplied to a camshaft of the internal combustion engine, wherein
    the baffle plate includes a discharge hole through which the oil separated from the blow-by gas by the oil separation chamber is discharged, and
    the cam spray plate includes a passage defining portion and a baffle plate portion, the passage defining portion defining the oil passage so that the oil passage is disposed without being overlapped with the discharge hole when viewed along an axial direction of the discharge hole, the baffle plate portion being integrated with the passage defining portion and overlapped with the discharge hole when viewed along an axial direction of the discharge hole.

2. The oil mist separator according to claim 1, wherein the baffle plate portion includes at least one fixed portion fixed to the baffle plate.

3. The oil mist separator according to claim 2, wherein
    the cylinder head cover, the baffle plate, and the cam spray plate are made of plastic,
    the cylinder head cover is fixed to the baffle plate through welding,
    the baffle plate is fixed to the cam spray plate through welding,
    the fixed portion is fixed to the baffle plate through welding, and
    the fixed portion overlaps a weld part in a thickness direction of the baffle plate, the cylinder head cover and the baffle plate being welded to each other by the weld part.

4. The oil mist separator according to claim 2, wherein
the at least one fixed portion includes fixed portions spaced apart from each other, and
a discharge portion is arranged between the fixed portions so that oil in a gap between the baffle plate portion and the baffle plate is discharged through the discharge portion.

5. The oil mist separator according to claim 1, wherein a position at which the cam spray plate is fixed to the surface of the baffle plate opposite to the cylinder head cover is disposed between the passage defining portion and the baffle plate portion.

6. The oil mist separator according to claim 5, wherein the baffle plate and the cam spray plate are welded to each other by a weld part that is disposed at the position.

7. The oil mist separator according to claim 1, wherein the passage defining portion branches in two different directions from a connection portion through which oil is supplied to the oil passage.

8. The oil mist separator according to claim 1, wherein the baffle plate portion includes:

a bottom wall,
a first side wall extending from the bottom wall and toward the baffle plate, and
a second side wall extending from the bottom wall and toward the baffle plate,
wherein the first side wall and the second side wall are opposite one another.

9. The oil mist separator according to claim 8, wherein the oil passage is disposed adjacent to the first side wall, and the discharge hole is disposed adjacent to the second side wall.

10. The oil mist separator according to claim 1, wherein the baffle plate and the cam spray plate are welded to each other by a first weld part, a second weld part, and a third weld part,
the passage defining portion is disposed between the first weld part and the second weld part, and
the baffle plate portion is disposed between the second weld part and the third weld part.

* * * * *